C. Spofford,
Wood Molding Machine,
N°15,859.    Patented Oct. 7, 1856.
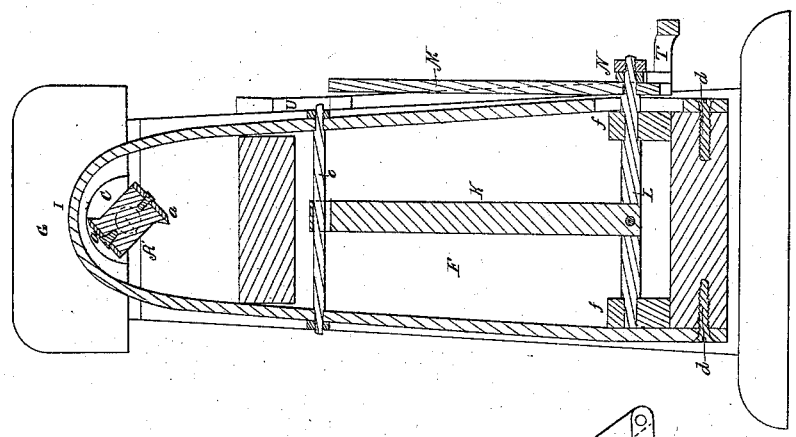
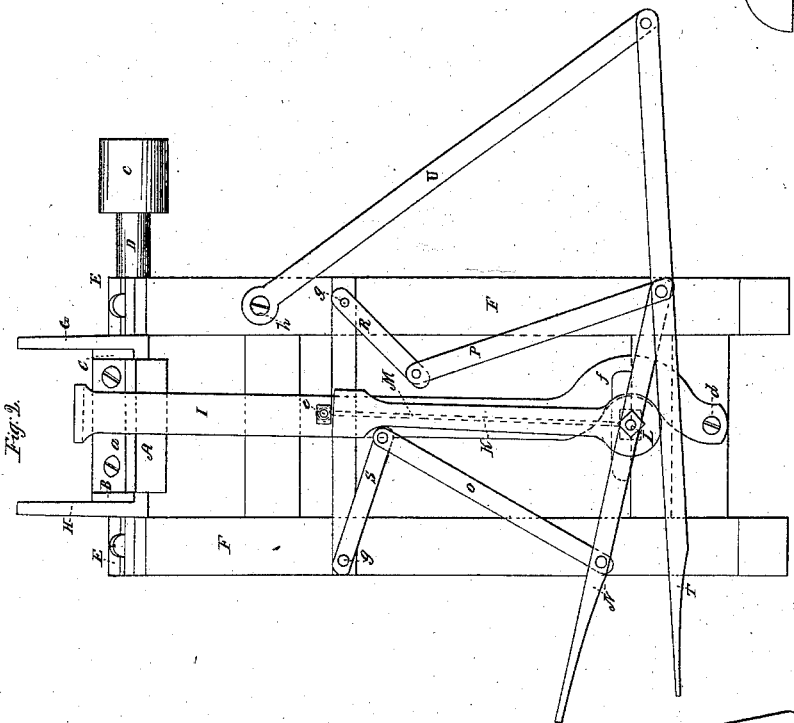
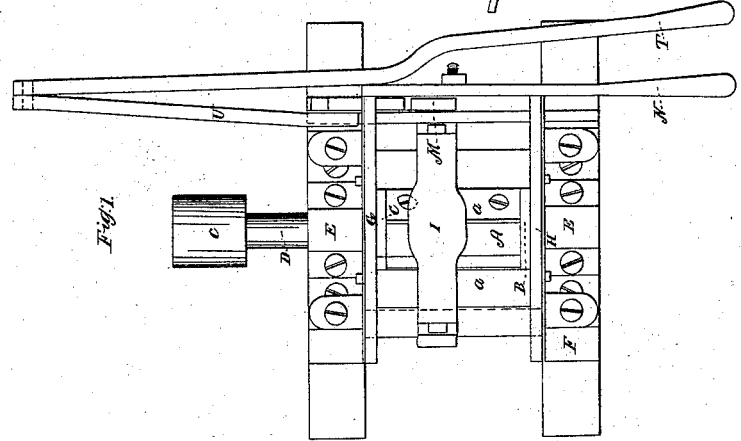

UNITED STATES PATENT OFFICE.

CHARLES SPOFFORD, OF AMESBURY, MASSACHUSETTS.

MACHINE FOR CUTTING IRREGULAR FORMS.

Specification of Letters Patent No. 15,859, dated October 7, 1856.

*To all whom it may concern:*

Be it known that I, CHARLES SPOFFORD, of Amesbury, in the county of Essex and State of Massachusetts, have invented a new and useful Machine for Cutting Irregular Forms; and I do hereby declare that the same is fully described and represented in the following specification and the accompanying drawings, of which—

Figure 1 exhibits a top view of said machine; Fig. 2, a side elevation of it; Fig. 3, a transverse section, such being taken at right angles to the cutter shaft to be hereinafter described.

In operating with my machine the work or piece of wood to be cut is fastened to a pattern which while the machine is in action, or its cutter stock in rotation is borne against either one or the other of the vertical tables (G, H) and the cylindrical cutter head (B or C) next adjacent to such table, the presser (I) serving to press on the work and maintain it against the table. Under these circumstances the pattern and work are moved along simultaneously, the cutter in the meantime reducing the work to the shape of the pattern.

In constructing my machine, I make use of a rotary or revolving cutter stock, A, provided with knives or cutters, $a$ $a$, and having two circular guide heads, B, C, arranged against its two ends and fixed with the cutter stock upon one common shaft, D, that is disposed horizontally and supported in boxes, E, E, applied to an upright frame, F, as seen in the drawings. A stationary bearer or table, G or H, is disposed with respect to each of the guide heads as shown in Figs. 1 and 2, such tables, G, H, being fastened to the frame work F. The cutter shaft, D, is furnished with a pulley, $c$, around which a belt may be caused to pass in order to put the shaft with its rotary cutter stock and guide heads simultaneously in revolution.

Many of the machines well known and in common use for cutting or turning irregular forms have two cutter stocks and one table, the stocks standing perpendicularly while the table is arranged horizontally. In my machine however only one cutter stock is used, and with it I employ two tables or their equivalents, the cutter stock being disposed horizontally while the inner faces of said tables are arranged vertically. The object of having two cutter stocks was to enable a piece of cross grained wood when fixed to a pattern to be cut in either direction as circumstances may require. By my arrangement and combination of two tables and a cutter stock I am enabled to obtain all the advantages of such other machines so far as operating on cross grained stuff is concerned, while I only use one rotary cutter stock, thus dispensing with one stock, and disposing of that which I employ in a manner very convenient to a workman as far as holding and managing his work is concerned. Furthermore, I arrange between the two tables, G, H, and so as to extend around above and below the cutter stock, as shown in Fig. 3, a vibratory spring presser, I, which I so apply to the frame, F, as to enable said presser to be moved toward either of the tables, G, H, as circumstances may require, the presser being supported on fulcra or screws, $d$, $d$, arranged as seen in Figs. 2 and 3. A spring, K, see Fig. 3, extends upward from a horizontal shaft L, and at its upper end is made to encompass or be attached to a rod, $e$, extending across the spring presser, as shown in said figure, the shaft, L, being supported in boxes, $f$, $f$, arranged above the screws, $d$, $d$, as shown in such figure. To one end of the shaft, L, an arm, M, is fastened, said arm being formed and made to rise upward above the shaft, L, and outside of the presser, as seen in the drawings.

A foot treadle or lever, N, turns on the outside end of the shaft, L, as a fulcrum and is connected by two pitmen, O, P, with two movable turning bearers R, S, arranged with respect to the arm, M, as shown in Figs. 1 and 2. Each of the pitmen is jointed to the treadle and one of the turning bearers, these latter being made to turn vertically on pins or fulcra, as seen at $g$, $g$, in Fig. 2. When the treadle is depressed by a person by placing his foot upon the longer arm of said treadle and forcing it downward the turning bearer, S, will be pressed against the arm, M, and will move it laterally and thereby cause the shaft L, to be turned in its bearings and in such manner as to produce a simultaneous movement of the spring, K, and the presser, I, toward the table, G, and as soon as the said bearer reaches a horizontal position, it will serve to stop or lock the arm, M, or prevent it from being moved backward. Under these circumstances the arm, M, will retain its position and prevent the shaft, L, from being rotated. While the shaft is so locked it will hold the foot of the spring in such manner as to enable the spring to act against the presser when said presser is moved either toward or away from the table, G. Again if we raise the treadle upward we shall not only move the presser and its spring toward the other table, H, but lock the spring in a proper position for it to act against the presser. As it is not always convenient to raise the foot treadle by an attendant applying his hand thereto, and as it is not always an easy matter to raise the treadle by the foot of the attendant, I combine with the treadle, M, an auxiliary treadle, T, which I joint to the lesser arm of the treadle, M, and also to a swinging bar, U, arranged and applied to the frame, F, or made to turn on a screw, h, as seen in the drawings. When the main treadle is depressed, the auxiliary treadle will be elevated, consequently if under these circumstances the attendant places his foot on the auxiliary treadle and depresses it he may elevate the main treadle so as to cause the presser to be moved toward the table, H. The presser serves the purpose of maintaining the pattern or the work as the case may be close up to the table against which such may be placed, and such presser being acted on by its spring will be moved by the work either toward or away from the table in accordance with the increase or decrease of thickness of the work and this when such work is fastened to a pattern and is moved forward over the revolving cutter stock and between the presser and the table G or H. The presser is of great advantage in preventing the pattern from slipping off the guide and being injured by the knives.

I do not claim the invention of a rotary cutter cylinder. Nor do I claim combining knives in any manner with a rotary cutter head or frame to hold said knives so that said head or any part of it may serve as a guide to the form or pattern carrying a material to be dressed.

What I claim is—

1. The combination of one rotary cutter, two guide heads B, and C, and two tables, G, H, arranged as described.

2. I also claim the combination of a vibratory spring presser, I, with a rotary cutter stock, A, and two tables, G, H, the said presser being made to operate with respect to the cutter stock and tables and either guide, B, C, as herein before specified.

3. I also claim the combination of mechanism for moving the vibratory spring presser and its spring toward either of the tables, and locking the shaft to the spring the same consisting of the arm, M, the two turning bearers, R, S, and the treadle or lever, N, connected to the bearer by pitmen, O, P, as described.

4. And in combination with the mechanism for moving the vibratory presser and its spring toward either of the tables and locking the shaft to the spring, I claim the auxiliary treadle, T, applied to the main treadle and supported by a swinging bar substantially as hereinbefore explained.

In testimony whereof, I have hereunto set my signature this eighth day of May, A. D. 1856.

CHARLES SPOFFORD.

Witnesses:
  R. H. EDDY,
  F. P. HALE, Jr.